(12) United States Patent
Karnin et al.

(10) Patent No.: US 10,397,152 B2
(45) Date of Patent: Aug. 27, 2019

(54) METHOD AND SYSTEM FOR PREDICTING FUTURE EMAIL

(71) Applicant: EXCALIBUR IP, LLC, New York, NY (US)

(72) Inventors: Zohar Karnin, Herzelia (IL); Yoelle Maarek, Haifa (IL); David Wajc, Haifa (IL); Iftah Gamzu, Rishon Lezion (IL)

(73) Assignee: EXCALIBUR IP, LLC, New York, NY (US)

( * ) Notice: Subject to any disclaimer, the term of this patent is extended or adjusted under 35 U.S.C. 154(b) by 158 days.

(21) Appl. No.: 14/291,422

(22) Filed: May 30, 2014

(65) Prior Publication Data

US 2015/0350132 A1     Dec. 3, 2015

(51) Int. Cl.
  *G06F 15/16* (2006.01)
  *H04L 12/58* (2006.01)
(52) U.S. Cl.
  CPC .............. *H04L 51/08* (2013.01); *H04L 51/02* (2013.01); *H04L 51/10* (2013.01)
(58) Field of Classification Search
  CPC .......... H04L 51/08; H04L 43/04; H04L 51/10
  USPC ....................................................... 709/206
  See application file for complete search history.

(56) References Cited

U.S. PATENT DOCUMENTS

| | | | | |
|---|---|---|---|---|
| 2005/0060643 | A1* | 3/2005 | Glass | G06F 17/241 715/205 |
| 2006/0059238 | A1* | 3/2006 | Slater | G06Q 10/107 709/206 |
| 2009/0144377 | A1* | 6/2009 | Kim | G06Q 10/10 709/206 |
| 2009/0177745 | A1* | 7/2009 | Davis | G06Q 10/107 709/204 |
| 2012/0245925 | A1* | 9/2012 | Guha | G06F 17/27 704/9 |
| 2012/0272160 | A1* | 10/2012 | Spivack | G06Q 10/10 715/752 |
| 2013/0318172 | A1* | 11/2013 | Liberty | G06Q 10/107 709/206 |

OTHER PUBLICATIONS

U.S. Appl. No. 14/020,614 (Karnin, et al.) filed Sep. 6, 2013.

* cited by examiner

*Primary Examiner* — Suraj M Joshi
*Assistant Examiner* — Jaren Means
(74) *Attorney, Agent, or Firm* — James J. DeCarlo; Greenberg Traurig, LLP

(57) ABSTRACT

Disclosed is a system, method, and non-transitory computer readable storage medium for predicting future messages. A processor receives a message sent to a user operating a client device, analyzes the message in light of previously identified patterns and scores assigned to scanned messages, determines a future message that should be received by the client device based on the received message, and transmits an item of information based on the determined future message.

20 Claims, 6 Drawing Sheets

METHOD AND SYSTEM FOR PREDICTING FUTURE EMAIL

FIELD

The present disclosure relates to messages, and more specifically to a method and system for predicting future email(s).

BACKGROUND

Electronic mail ("email") usages have become omnipresent in everyday use for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, customers, and the like. Commercial senders or merchants send many of the messages that users receive in their e-mail accounts. These messages include advertisements, promotions, coupons, purchase confirmations, royalty program messages, institution employee announcements, school notifications, and the like. The majority of these messages are machine generated emails originating from a template or boilerplate. Examples of such templates include textual templates and/or HyperText Markup Language (HTML) templates.

Sometimes, a specific email message is received after another email message is received. For example, a shipping confirmation email message is often received after an online purchase of a product is received.

SUMMARY

These messages can be predicted to provide further services, such as advertisements or notifications.

In one aspect, the present disclosure relates to a system, method, and computer readable storage medium for predicting future messages. A processor receives a message (e.g., an email) sent to a user operating a client device, analyzes the message in light of previously identified patterns and scores assigned to scanned messages, determines likely content of a future message (e.g., email message) that should be received by the client device based on the received message, and transmits an item of information (e.g., a targeted advertisement or a notification) based on the likely content of the future message.

In one embodiment, the processor scans messages from a plurality of message inboxes. The processor identifies templates from the plurality of scanned messages. The processor can determine whether the scanned messages are created by spontaneous appearance, created by appearance due to temporal event, or created by appearance due to a previous message. In one embodiment, the processor identifies patterns with scanned messages and assigns a score to messages in the scanned messages. In one embodiment, the transmitting of a targeted advertisement or a notification further comprises transmitting a notification that the user should be receiving the determined future message. The transmitting of a targeted advertisement or a notification can also further include transmitting a targeted advertisement for a product or service related to the determined future message.

In one embodiment, the scanning of a plurality of messages from a plurality of message inboxes is an offline process occurring before the receiving of the message. In one embodiment, the identifying of templates from the plurality of scanned messages is an offline process occurring before the receiving of the message.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
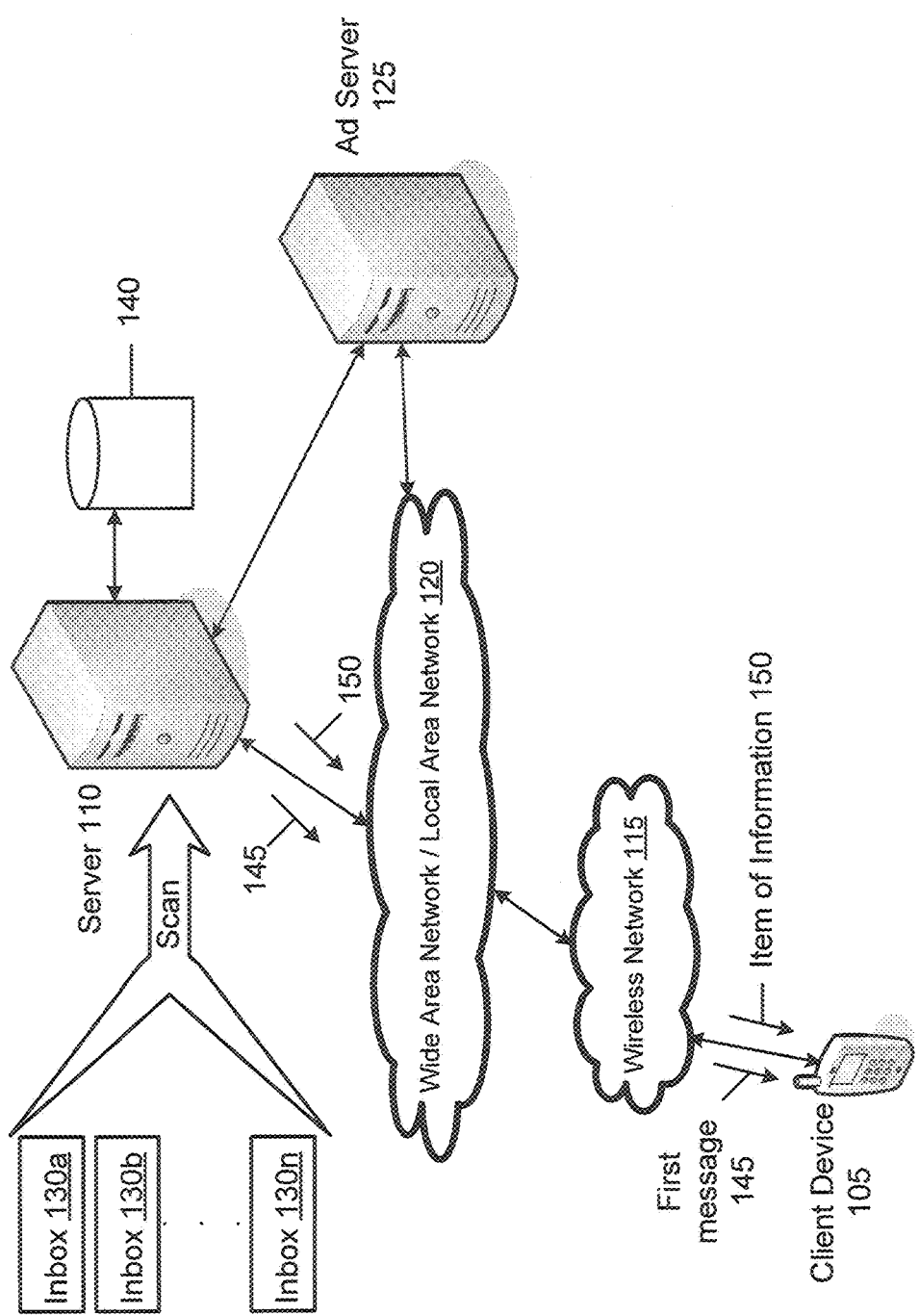
FIG. 1 is a schematic diagram illustrating an example system of a network and devices implementing embodiments of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 (also referred to herein as client 105) in communication with a server 110 over a wireless network 115 connected to a local area network (LAN)/wide area network (WAN) 120, such as the Internet. Server 110 is also referred to below as server computer 110. In one embodiment, the client device 105 and/or the server 110 is also in communication with an advertisement server (ad server) 125 that can provide advertisements to the client device 105. Although shown as a wireless network 115 (and WAN/LAN 120), the client device 105 can communicate with server 110 via any type of network.

The server 110 scans a plurality of message inboxes 130a, 130b, . . . 130n and stores these messages in the message inboxes in a database 140. Although shown with "n" message inboxes, any number of inboxes can be scanned. The server 110 performs this scan offline—before initially communicating online with the client 105. The server 110 analyzes the scanned messages and obtains one or more patterns associated with one or more of the scanned messages. In one embodiment, the server 110 stores these identified patterns in database 140. The server 110 then transmits a first message 145 to the client device 105. In one embodiment, the server 110 is the client's email server 110. The client 105 can have an email client, such as Microsoft Outlook®, or a web-based client, such as Google Gmail® or Yahoo! Mail®, for receiving and/or sending email messages. Alternatively, the client 105 sends a first message 145 to the server 110 for delivery to another client device (not shown). Although described below as email messages, any message can be used. Examples of such messages can include HTML forms, email messages, comments to an article or website, online forum posts/entries, word processing documents, help desk messages, portable document format (PDF) documents and/or other types of documents.

In one embodiment, the server 110 uses the identified patterns to predict an email message that the client 105 should receive based on the first email 145. As an example, suppose the user of the client device 105 makes an online purchase of a product. The online merchant typically sends an email with a receipt confirming the purchase of the product to the client 105. Based on this receipt email (first email 145), the server 110 can predict that the client 105 should receive a shipping notification email shortly thereafter (e.g., within the next few days or week(s)) indicating that the product has shipped.

The server 110 can then, once the prediction is made, transmit an item of information 150 (e.g., an advertisement or notification 150) to the client 105. The advertisement may be for products related to the purchased product. A notification may be that the user should be expecting a shipping notification email soon or can be that a shipping notification email has not yet been received by the user for the purchased product. This notification can alert the user of the client 105 to call or reach out to the merchant to see when the product will be shipped (e.g., if the scheduled shipping date has passed). Information can also be a message, recommendation, suggested action, coupon, product offering or other textual, audio or audiovisual content.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a server include desktop computers, multiprocessor systems, microprocessor-type or programmable consumer electronics, etc. Server 110 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment, the content server 110 hosts or is in communication with a database.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

An ad server 125 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Moreover, although FIG. 1 illustrates server 110 as a single computing device, the disclosure is not so limited. For example, one or more functions of server 110 may be distributed across one or more distinct computing devices. Moreover, in one embodiment, multiple servers may be integrated into a single computing device, without departing from the scope of the present disclosure.

In one embodiment and as described herein, the client device 105 and/or server 110 is a smartphone. In another embodiment, the client device 105 and/or server 110 is a tablet. The client device 105 and/or server 110 may also be a wearable computing device, such as glasses (e.g., Google® Glass®) or a watch.

Figure 2:
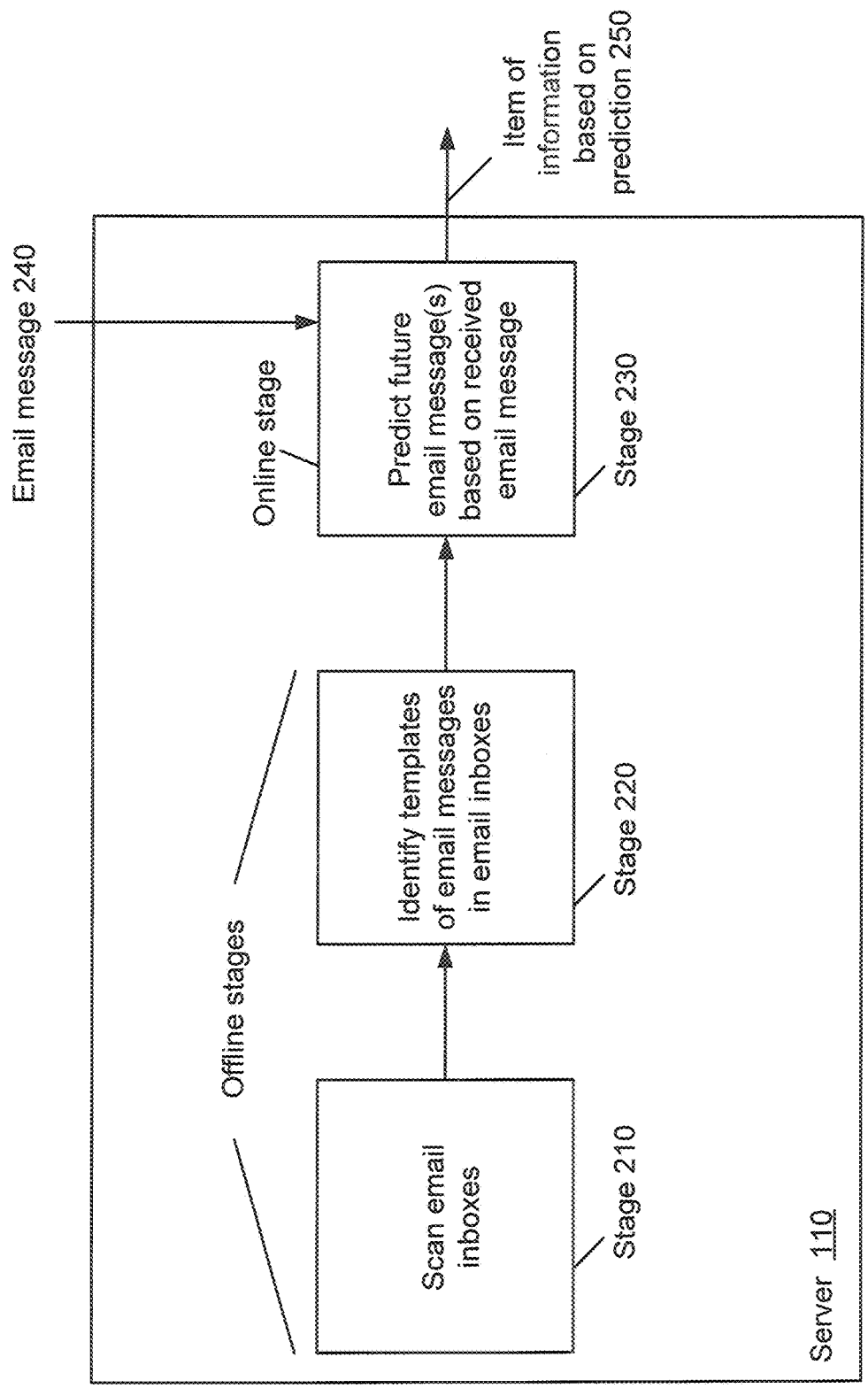
FIG. 2 is a flow diagram stages performed by the server of FIG. 1 in accordance with an embodiment of the present disclosure.

FIG. 2 is a flow diagram of an embodiment of stages performed by server 110. The server 110 performs a horizontal scan of email inboxes 130*a*, 130*b*, . . . 130*n* in an offline stage 210. The server 110 identifies templates of email messages in the email inboxes 130*a*, 130*b*, . . . 130*n* in an offline stage 220. Each email template corresponds to characteristics of a received machine-generated email, the characteristics of the received machine-generated email relating to static data of the machine-generated email. In one embodiment, the server 110 generates a template causality graph by analyzing the email templates to determine a statistical causality between templates of the email templates. The determining of the statistical causality between templates includes determining that a first received machine-generated email associated with a first template is a result of a second received machine-generated email associated with a second template.

The second offline stage 220 is learning a causal graph over email templates. Given the causal graph, the likelihood that one email follows another can be determined. The third stage 230, which is online, involves receiving an email message 240. The third stage 230 predicts future email message(s) within a predetermined time period based on one or more received email message. In one embodiment, as the causal graph relating to many email messages is used to determine a future email message, a "wisdom of the crowds" determination is used to ascertain a causal relationship between email messages. In one embodiment, emails are identified based on their subject lines.

In one embodiment, the offline stages are executed multiple times throughout a given time period (e.g., month). This may occur before, during, or after the server 110 communicates with client 105.

The server 110 transmits an item of information 250 such as a notification or advertisement to the client 105 based on the prediction. Specifically, the prediction mechanism can be used for 1) targeted advertisements—if the server 110 can predict a purchase within a range of a time period (e.g., a week), the server 110 or advertisement server 125 can push related advertisements; and 2) improving the user experience—if a shipment notification should be received but still hasn't arrived (or it was accidentally marked as spam), the server 110 can notify the user to check with the merchant about the shipment. In one embodiment, the server 110 can, after a notification, perform an action for the user, such as to contact a third person (e.g., doctor's office to confirm an appointment) or to place an appointment in the user's calendar (e.g., for a doctor's appointment). Alternatively, any non-arrival of an email that should arrive can be surfaced.

The offline stages can be considered to be a generative model. Given an inbox and a time window (e.g., an hour, a day, or a week), the server 110 can predict via the generative model which types of email messages will arrive to the client inbox within the given time frame. A type of message is in the granularity of a purchase from a specific merchant or vendor, a shipment from a specific vendor or shipment service, a friend request from a specific social network, etc.

Figure 3:
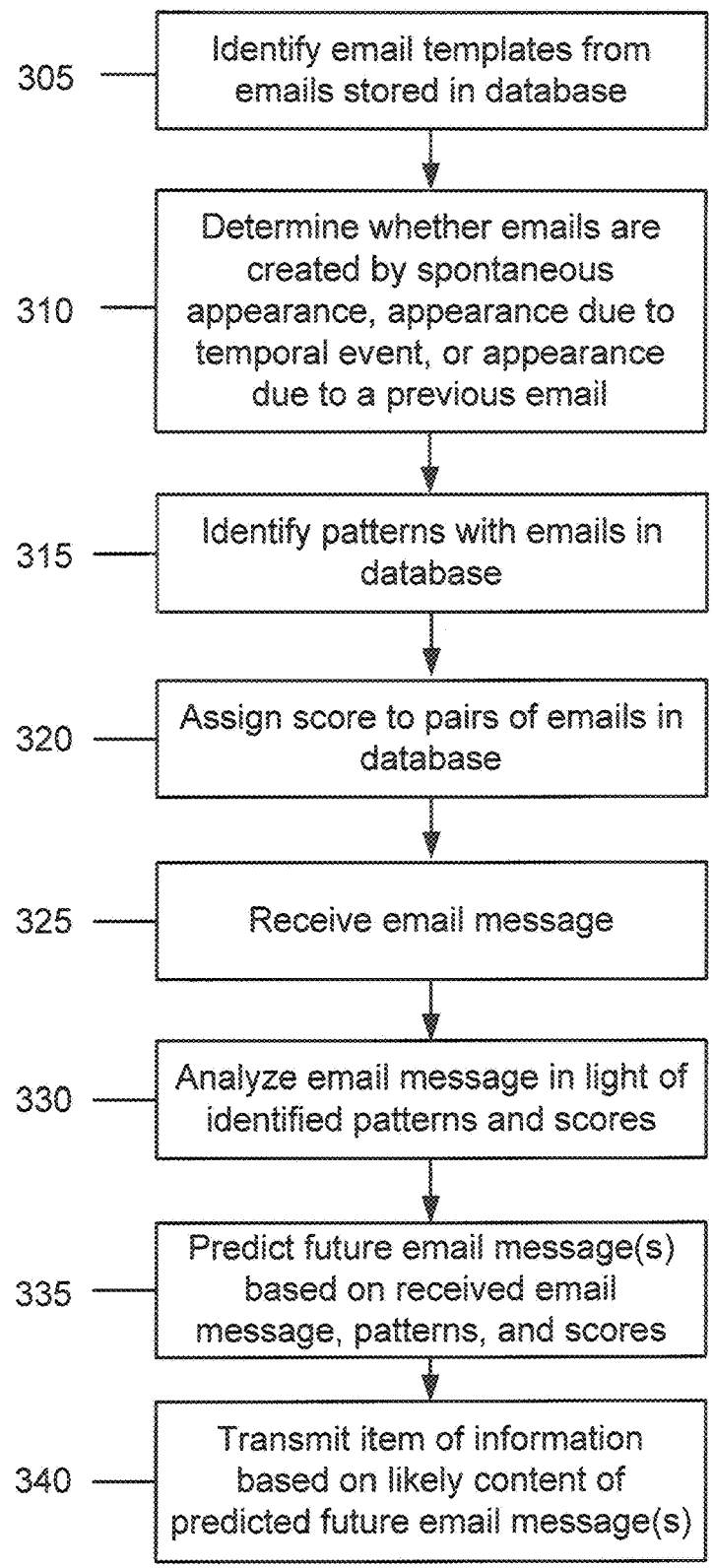
FIG. 3 is a flowchart illustrating steps performed by the server of FIG. 1 in accordance with an embodiment of the present disclosure.

FIG. 3 is a flowchart showing an embodiment of the steps performed by the server computer 110. In one embodiment, the server computer 110 identifies email templates from emails stored in the database 140 (Step 305). In one embodiment, the server 110 determines whether emails are created by spontaneous appearance, appearance due to a temporal event, or appearance due to a previous email (Step 310). Emails created by spontaneous appearance include emails appearing due to an unobserved event. As a non-limiting example, emails created by spontaneous appearance include emails related to a purchase or emails related to a password change request. Emails created by appearance due to a temporal event include emails that appear at or within specific times (e.g., next to a temporal event such as the beginning of the month or week). For example, a weekly newsletter or a monthly statement are emails appearing due to a temporal event. Emails appearing due to a previous email include, as stated above, a shipment notice. One can predict a shipment notice will arrive by noticing a receipt for the purchase of an item.

The server 110 then identifies patterns with emails in the database 140 (Step 315). In one embodiment, the server 110 identifies connections between pairs of emails. For example, for a promotion, after the user sees a promotion of type A, the user is likely to purchase item of type B. As another example, after purchasing a product from type A, purchase product from type B. In one embodiment, the server 110 does this automatically by going through inboxes and noticing that template A appears before template B many times. This is a frequency analysis and the determination of causal relationships or patterns. In one embodiment, the determination of a pattern is that a first email is often received in light of a receipt of a second email. Specifically, one email typically causes a specific second email. The second email appears frequently in response to receipt of the first email.

For each pair of these emails, the server 110 assigns a score to the pairs of emails in the database 140 (Step 320). In one embodiment, a higher score represents an email that is more likely caused by the other email in the pair. For example, a promotion email and a purchase email would get a score, but the score would likely be a low score because not every promotion results in a purchase. A purchase email and a shipment email would likely get a high score because every online purchase gets shipped. These scores are, in one embodiment, analyzed to determine an email that will be predicted.

In one embodiment, the server 110 scans a large list of possible templates from the email inboxes 130*a* . . . 130*n* and creates a short list of candidates (e.g., 50-100 possible templates). The server 110 determines a template that can be caused by another template that appears in the email inboxes. In other words, for any template in the email in the inboxes that is seen, there is a pre-saved list for the possible templates that it could create or cause. For each candidate, the server 110 computes the score and this score is computed by reviewing all emails in the inboxes for within a specific time window (e.g., one month). Thus, the server 110 has a single candidate and all inbox emails in the last month. The server 110 sums the causality scores as a total score. In one embodiment, the server 110 uses a threshold to eliminate many of the candidates and then the server 110 has a list of a few candidates that are the most likely as a prediction. In one embodiment, for advertisement targeting, the server 110 considers less likely candidates. For interfacing and notifications, the server 110 considers more likely candidates. In one embodiment, a parameter is set as an assignment for advertisement targeting and another parameter is set for interfacing and notifications. This may determine how high the threshold is. In one embodiment, the parameter(s) are the thresholds. In one embodiment, the threshold is set by the server 110 or by a user.

The server 110 then receives an email message for a specific user (Step 325). The server 110 analyzes the email message in light of identified patterns and scores (Step 330). Specifically, given the assigned scores, in one embodiment the server 110 looks at the email the user received and computes a probability for each template or type of email to be delivered within the next period of time (e.g., within the next week). The server 110 analyzes the list and determines the few that are most relevant. The server 110 then predicts likely content of future email message(s) based on the received email message (Step 335). The server 110 then transmits an item of information (e.g., targeted advertisement or notification) based on the likely content of predicted future email message(s) (Step 340).

In one embodiment, the server 110 predicts that the user is going to move and offers a change in the user's phone number or address in a social media site (e.g., Facebook®). In one embodiment, as described above, the server 110 can offer a reminder saying the user should have received a shipment email. In one embodiment, the server 110 can connect the user to the merchant's (e.g., Amazon®'s) customer service representative. For example, the server 110 can look up the merchant's customer service line on the web and call the associated telephone number (e.g., via VOIP).

Figure 4:
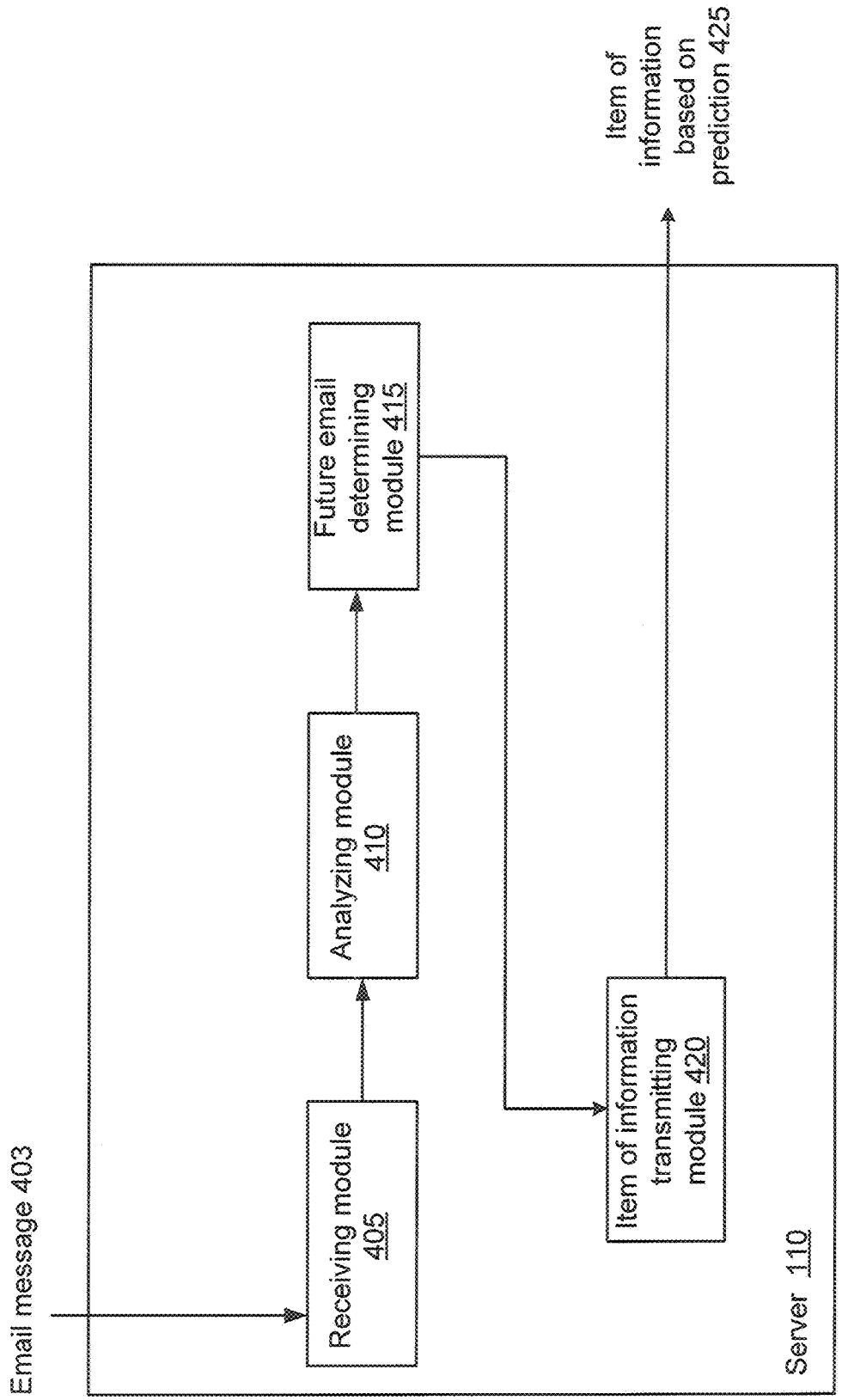
FIG. 4 is a block diagram illustrating modules of the server of FIG. 1 in accordance with an embodiment of the present disclosure.

FIG. 4 shows an embodiment of a block diagram of the server 110 including several modules. An email message 403 is received by receiving module 405. The receiving module 405 transmits this email message 403 to the analyzing module 410. In one embodiment, the analyzing module 410 determines, from its templates obtained via a previous scan of multiple inboxes, a template for the email message 403. In one embodiment, the analyzing module 410 determines a list of candidate emails from an analysis of the template based on other templates. The analyzing module 410 sends this list of candidate emails to the future email determining module 415. The future email determining module 415 determines, based on a threshold, email or emails from the list of candidate emails as the likely future email. The future email determining module 415 transmits this likely future email to the item of information transmitting module 420. This module 420 determines an item of information 425 (e.g., notification or advertisement 425) to send based on the prediction.

For example, JetBlue® sends emails regarding people's travel itineraries (e.g., flights), where a regular expression for such emails, referred to as a candidate template, includes "Check In for your flight". An array of messages is compiled from message traffic originating from JetBlue® (e.g., @jetblue.com) by identifying messages that have "Check In for your flight" in the subject line. Then, the email bodies of such messages are extracted and compared. The comparison corresponds to the message format or email structure of each message's body.

If the message bodies are sufficiently similar, then the messages may be validated. That is, the messages have been confirmed to have originated not only from the same web site, but also via the same automatic process. In other words, the domain utilized the same message template for structuring and drafting the email messages. If the message bodies are not found to be sufficiently similar, then the message body (e.g., template for that message or format) is discarded.

For validated messages, a generalization step occurs next to identify wild cards (or words that change from message to message despite messages having been originated via the same process). The content of each message is then analyzed to determine wild cards occurring in each message. This analysis comprises comparing each message's content to identify content that differs within each validated message. Examples of wild cards include, but are not limited to, airport codes, city names, country names, dates, times, sender's names, salutations, recipient's names, greetings, and the like. According to some embodiments, the text of a message is analyzed, and in some embodiments, all of the content is analyzed, accounting for text, audio, video, images, attachments, and the like.

For example, from the above JetBlue® example, for two validated messages associated with the candidate template arising from the subject line identification of "Check In to your flight", there will be differences between the messages despite originating from the same domain and utilizing the same automatic generation process. For example, message 1 states "Check In to you flight LAX to EWR", whereas message 2 states "Check In to your flight AUS to BNA." Therefore, the regular expression is "Check In to your flight", and the wild card text is the text that follows the regular expression. Specifically, the wild cards can be identified as "LAX", "EWR", "AUS" and "BNA." Indeed, while the message template is the same for each message, the specifics of each message may change, as in this example where each message's flight itinerary relayed different flight information, but still maintained the same format and structure.

In another example, two messages state "your order of X" and "your order of Y". Therefore, from the above discussion, it is known that the expression "your order of" is the regular expression and is formatted within the structural design of the email message. The text "X" and "Y" will then be identified as the wild cards as they differ from each validated message, in that a message having been identified as being sent via the same automatic process still can carry differences in content specific to the context of each message.

For each site's or domain's candidate template(s), a template listing is formed based on the analysis of validated email bodies and a generalization step. That is, for each site, and for each site's original candidate listing, a validated candidate listing is compiled, which also includes or has associated therewith information regarding types of wild cards utilized in each message, and in some embodiments, locations of such wild cards within such message types. Therefore, for newly incoming message traffic, the validated candidate listing can be applied to such messages to perform message extraction. That is, for an incoming message from a specific domain, the domain specific validated candidate template is applied to that message, and based on this application, data extraction occurs. Such data extraction is applied respective the email format identified via the validation process of the email bodies extracted from the array of message. Additionally, the data extraction also accounts for the wild cards determined in the generalization step, where information regarding such wild cards and/or their locations within message bodies is applied or utilized in extracting message content from incoming messages.

For example, from the above example regarding JetBlue®, a validated candidate template has been compiled for emails from JetBlue® regarding "Checking In" to a flight. Thus, the format and structure of such emails has been identified (and verified). Additionally, via the generalization step, wild cards, their usage and location of such usage within such email messages (or within such layouts) have also been identified. This information is associated with the validated candidate template (in storage on the server 110, or in associated database 140). Therefore, upon receiving another message for "Checking In" from JetBlue®, the validated candidate template for "Checking In" respective JetBlue® is applied. For example, user A receives a message stating "Check In to your flight SFO to AUS". The term "AUS" has previously been identified, therefore it has been identified as a wild card. Although "SFO" has not been previously identified as a wild card, the location of wild cards coincides with "SFO"'s location, therefore SFO can be identified as a wild card. As such, based on the extraction of message respective the message body and wild card(s), extraction of the message can compile information of high relevance to the user, which from this example, can include a travel itinerary.

Once an email from JetBlue® is received and the server 110 determines that this email is from JetBlue®, the server 110 can, for example, send an advertisements to the user for luggage, hotels, and/or any other product relating to, e.g., traveling.

Figure 5:
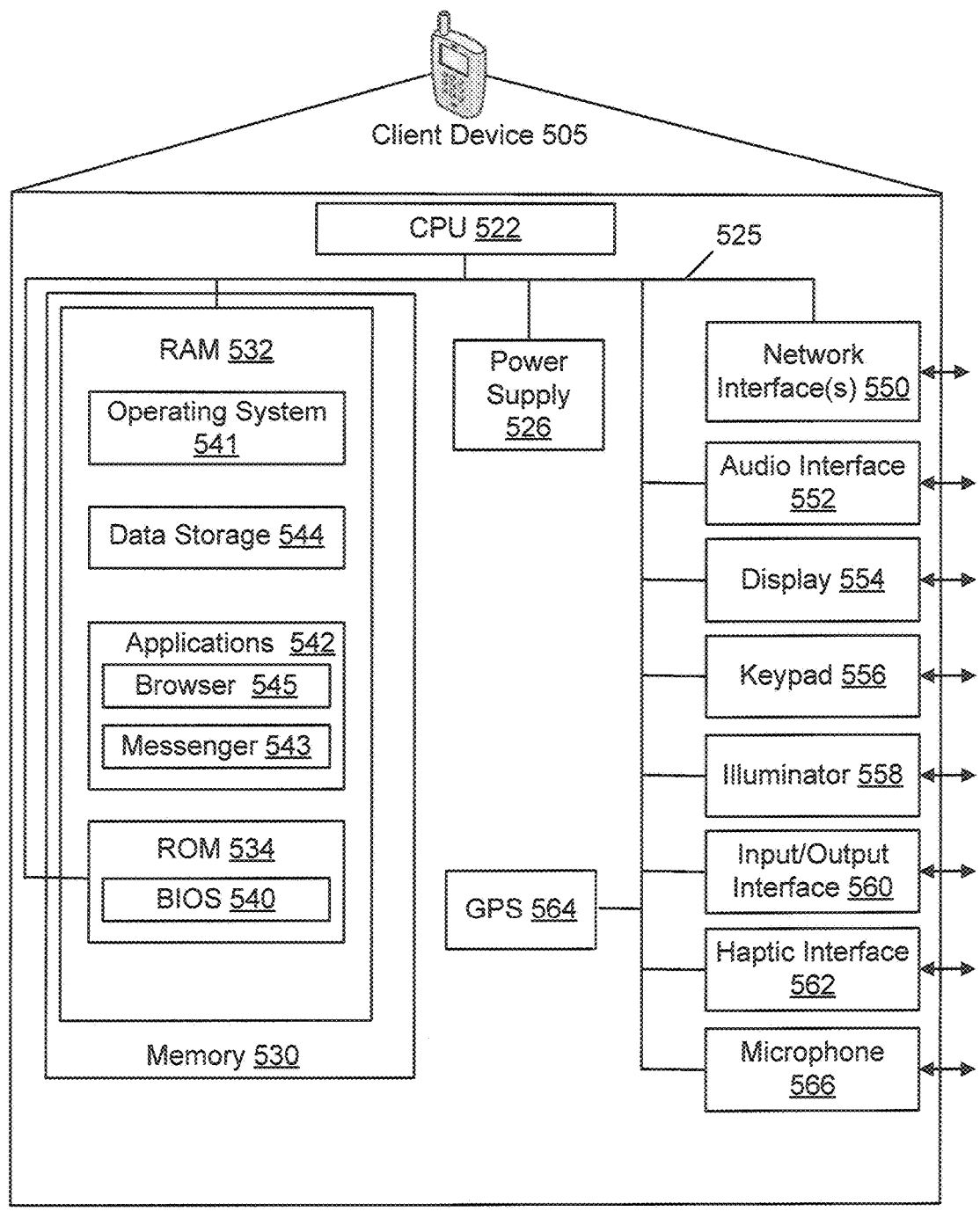
FIG. 5 shows an example of a schematic diagram illustrating a client device in accordance with an embodiment of the present disclosure.

FIG. 5 shows one example of a schematic diagram illustrating a client device 505 (e.g., client device 105). Client device 505 may include a computing device capable of sending or receiving signals, such as via a wired or wireless network. A client device 505 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 505 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 505 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 5, client device 505 may include one or more processing units (also referred to herein as CPUs) 522, which interface with at least one computer bus 525. A memory 530 can be persistent storage and interfaces with the computer bus 525. The memory 530 includes RAM 532 and ROM 534. ROM 534 includes a BIOS 540. Memory 530 interfaces with computer bus 525 so as to provide information stored in memory 530 to CPU 522 during execution of software programs such as an operating system 541, application programs 542, device drivers, and software modules 543, 545 that comprise program code, and/or computer-executable process steps, incorporating functionality described herein, e.g., one or more of process flows described herein. CPU 522 first loads computer-executable process steps from storage, e.g., memory 532, data storage medium/media 544, removable media drive, and/or other storage device. CPU 522 can then execute the stored process steps in order to execute the loaded computer-executable process steps. Stored data, e.g., data stored by a storage device, can be accessed by CPU 522 during the execution of computer-executable process steps.

Persistent storage medium/media 544 is a computer readable storage medium(s) that can be used to store software and data, e.g., an operating system and one or more application programs. Persistent storage medium/media 544 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 505 can also include one or more of a power supply 526, network interface 550, audio interface 552, a display 554 (e.g., a monitor or screen), keypad 556, illuminator 558, I/O interface 560, a haptic interface 562, a GPS 564, and/or a microphone 566.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 6:
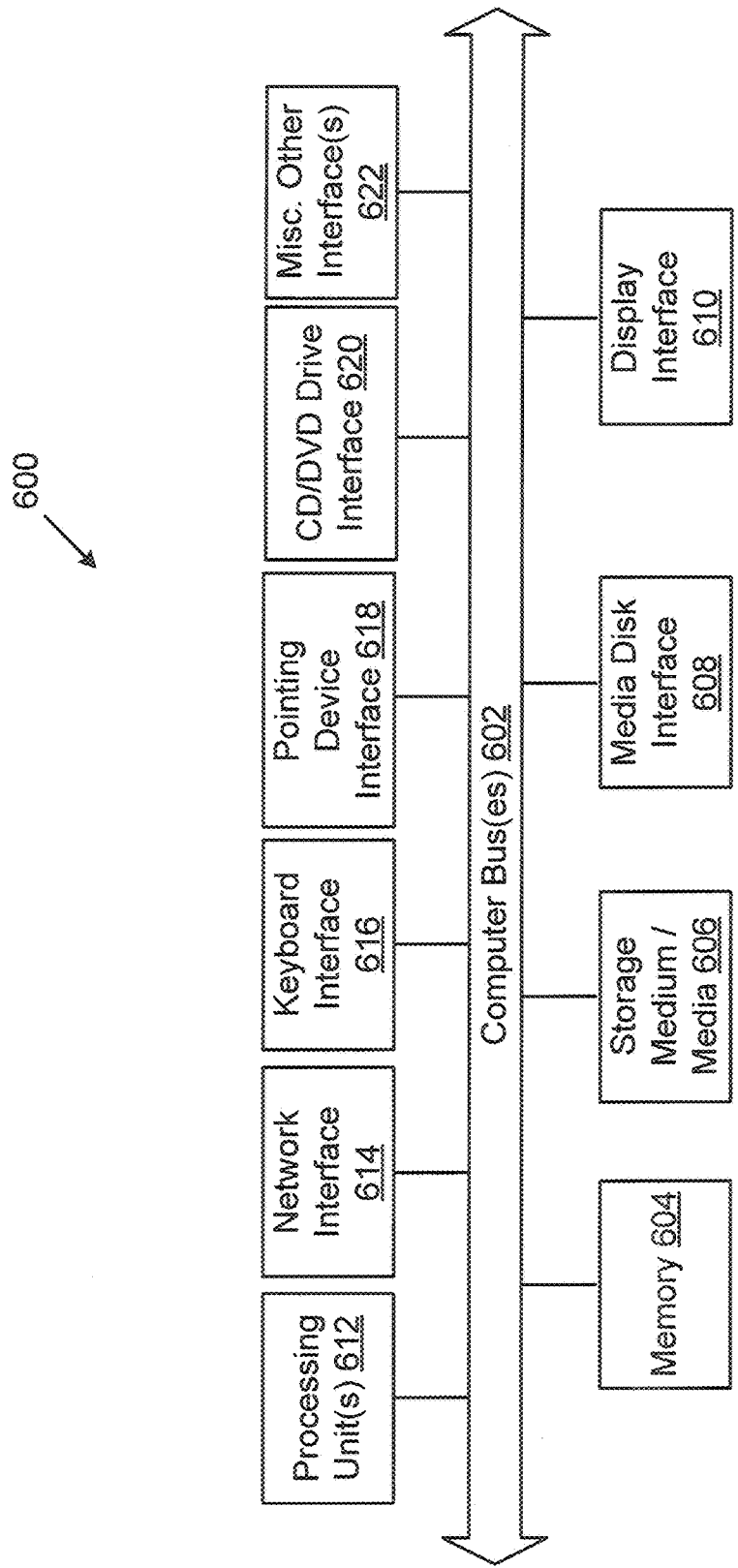
FIG. 6 is a block diagram illustrating an internal architecture of a computer in accordance with an embodiment of the present disclosure.

FIG. 6 is a block diagram illustrating an internal architecture of an example of a computer, such as server computer 122, 130, 135, 140 and/or client device 105, 110, 125, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, CD/DVD drive interface 620, and miscellaneous other interfaces 622, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

As described above, persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
scanning, by a processor, a plurality of email messages from a plurality of email message inboxes;
identifying, by the processor, patterns based upon an analysis of scanned email messages, wherein a pattern identifies a temporal and causal connection between at least two email messages;
receiving, by the processor, a message sent to a user operating a client device;
determining, by the processor, likely content of a future email message that should be received in an inbox of the client device based on the received email message and based on the patterns, wherein the future email message comprises an email message not yet received and expected to be received by the client device from a third-party email account within a predetermined amount of time from a time associated with the email message based on the patterns; and
transmitting, by the processor, an item of information based on the determined likely content of the future email message, the item of information transmitted to user separate from and prior to actual receipt of the future email message.

2. The method of claim 1, wherein the transmitting of the item of information further comprises transmitting a notification.

3. The method of claim 1, further comprising identifying, by the processor, templates from the plurality of scanned email messages.

4. The method of claim 3, further comprising determining, by the processor, whether the scanned email messages are created by spontaneous appearance, created by appearance due to temporal event, or created by appearance due to a previous email message.

5. The method of claim 3, wherein the identifying of templates from the plurality of scanned email messages is an offline process occurring before the receiving of the email message.

6. The method of claim 1, further comprising assigning, by the processor, a score to email messages in the scanned email messages.

7. The method of claim 1, wherein the transmitting of an item of information further comprises transmitting a notification that the user should be receiving the future email message.

8. The method of claim 1, wherein the transmitting of an item of information further comprises transmitting a targeted advertisement related to the likely content of the future email message.

9. The method of claim 1, wherein the scanning of a plurality of email messages from a plurality of email message inboxes is an offline process occurring before the receiving of the email message.

10. The method of claim 1, further comprising transmitting, by the processor, an advertisement.

11. A computing device comprising:
a processor;
a memory device for tangibly storing thereon program logic for execution by the processor, the program logic comprising:
scanning logic executed by the processor for scanning a plurality of email messages from a plurality of email message inboxes;
pattern identification logic executed by the processor for identifying patterns based upon an analysis of scanned email messages, wherein a pattern identifies a temporal and causal connection between at least two email messages;
receiving logic executed by the processor for receiving an email message sent to a user operating a client device;
determining logic executed by the processor for determining likely content of a future email message that should be received in an inbox of the client device based on the patterns, wherein the future email message comprises an email message expected to be received by the client device from a third-party email account within a predetermined amount of time from a time associated with the email message based on the patterns; and
transmitting logic executed by the processor for transmitting an item of information based on the determined likely content of the future email message, the item of information transmitted to user separate from and prior to actual receipt of the future email message.

12. The computing device of claim 11, further comprising identifying logic executed by the processor for identifying templates from the plurality of scanned email messages.

13. The computing device of claim 12, further comprising creation determining logic executed by the processor for determining whether the scanned email messages are created by spontaneous appearance, created by appearance due to temporal event, or created by appearance due to a previous email message.

14. The computing device of claim 11, further comprising assigning logic executed by the processor for assigning a score to email messages in the scanned email messages.

15. The computing device of claim 11, wherein the transmitting logic for transmitting the item of information further comprises notification transmitting logic executed by the processor for transmitting a notification that the user should be receiving the future email message.

16. The computing device of claim 11, wherein the transmitting logic for transmitting the item of information further comprises advertisement transmitting logic executed by the processor for transmitting a targeted advertisement related to the likely content of the future email message.

17. The computing device of claim 11, wherein the scanning logic for scanning a plurality of email messages from a plurality of email message inboxes is an offline process occurring before the receiving of the email message.

18. The computing device of claim 11, wherein the transmitting logic for transmitting the item of information further comprises transmitting logic for transmitting a notification.

19. The computing device of claim 11, further comprising second transmitting logic for transmitting an advertisement.

20. A non-transitory computer readable storage medium tangibly storing computer program instructions capable of being executed by a computer processor, the computer program instructions defining the steps of:
scanning, by the processor, a plurality of email messages from a plurality of email message inboxes;
identifying, by the processor, patterns based upon an analysis of scanned email messages, wherein a pattern identifies a temporal and causal connection between at least two email messages;
receiving, by the processor, an email message sent to a user operating a client device;
determining, by the processor, likely content of a future email message that should be received in an inbox of the client device based on the received email message and based on the patterns, wherein the future email message comprises an email message expected to be received by the client device from a third-party email account within a predetermined amount of time from a time associated with the email message based on the patterns; and
transmitting, by the processor, an item of information based on the determined likely content of the future email message, the item of information transmitted to user separate from and prior to actual receipt of the future email message.

* * * * *